United States Patent [19]

Agadi

[11] Patent Number: 4,470,245
[45] Date of Patent: Sep. 11, 1984

[54] COTTON HARVESTING METHOD AND MACHINE

[76] Inventor: Yitshaq Agadi, 32 Ben Yehuda St., Tel Aviv 63805, Israel

[21] Appl. No.: 384,641

[22] Filed: Jun. 3, 1982

[30] Foreign Application Priority Data

Feb. 7, 1981 [IL] Israel .......................... 63226

[51] Int. Cl.³ .......................................... A01D 45/18
[52] U.S. Cl. ..................................... 56/28; 56/16.5; 56/DIG. 2; 171/61
[58] Field of Search ............. 56/28, 40, 49, 16.5, 56/27.5, 14.2, DIG. 2; 171/28, 38, 61

[56] References Cited

U.S. PATENT DOCUMENTS

| | | | |
|---|---|---|---|
| 2,451,130 | 10/1948 | Townsend | 56/16.5 |
| 2,645,889 | 7/1953 | Warner | 171/38 |
| 2,902,997 | 9/1959 | Hawkins et al. | 171/28 |
| 3,827,503 | 8/1974 | Hansen | 171/28 |

FOREIGN PATENT DOCUMENTS 494146 3/1976 U.S.S.R. .................. 56/16.5

*Primary Examiner*—Jay N. Eskovitz
*Attorney, Agent, or Firm*—Toren, McGeady and Stanger

[57] ABSTRACT

A method of harvesting cotton includes cutting the cotton plant a short distance above ground, clampingly hold the bush with its main stem substantially in the vertical and imparting revolving movement to the plant at high speed, thus causing cotton bolls to be thrown off the plant by centrifugal force and collecting the thrown off bolls.

4 Claims, 3 Drawing Figures

COTTON HARVESTING METHOD AND MACHINE

The present invention relates to a method of harvesting cotton and to a machine for performing the method.

As is known the cotton plant is a low bush from which in conventional work the bolls of cotton are picked to be collected in travelling containers. In modern cotton raising farms, the bushes are planted in straight rows which permits the application of the new method.

According to the invention the cotton harvesting process comprises the steps of
- (a) cutting the cotton plant a short distance above ground,
- (b) clampingly hold the bush with its main stem substantially in the vertical, and
- (c) imparting revolving movement to the plant at high speed, thus causing cotton bolls to be thrown off the plant by centrifugal force,
- (d) collecting the thrown off bolls.

The machine for performing the above method—according to the invention—comprises a wheeled chassis adapted to be pulled by a tractor, cutting means being provided at the leading end of the machine, two pairs of drums with their axes positioned vertically and defining a rectangle, an endless belt being slung about each pair, the vicinal (inner) runs of the two belts being close to one another, all drums being rotationally driven at the same sense of rotation, a band conveyor being provided at each side of the machine, parallel to the said belts and at lower level than the underside of the drums about which the belts are slung.

Figure 2:
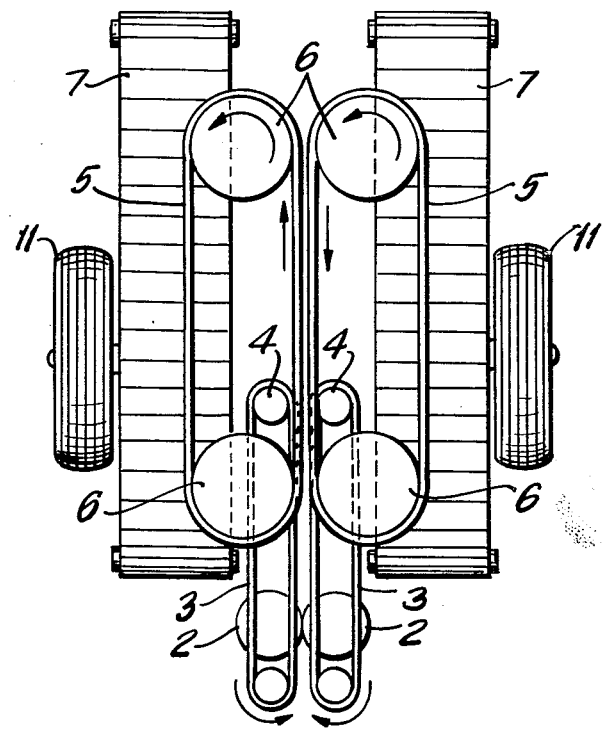
Figure 3:
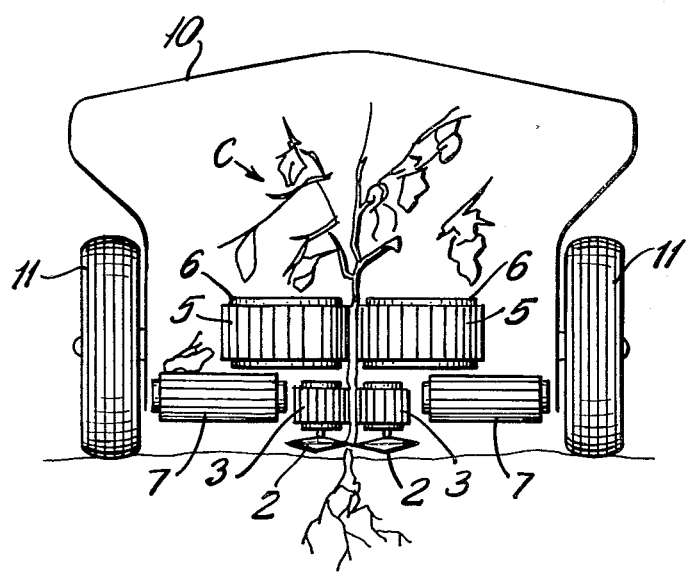

The invention will now be described with reference to the accompanying drawings, which show in FIG. 1 a phantom view of the new machine, FIG. 2 being a plan view, and FIG. 3 a frontal, elevational view of the machine.

Figure 1:
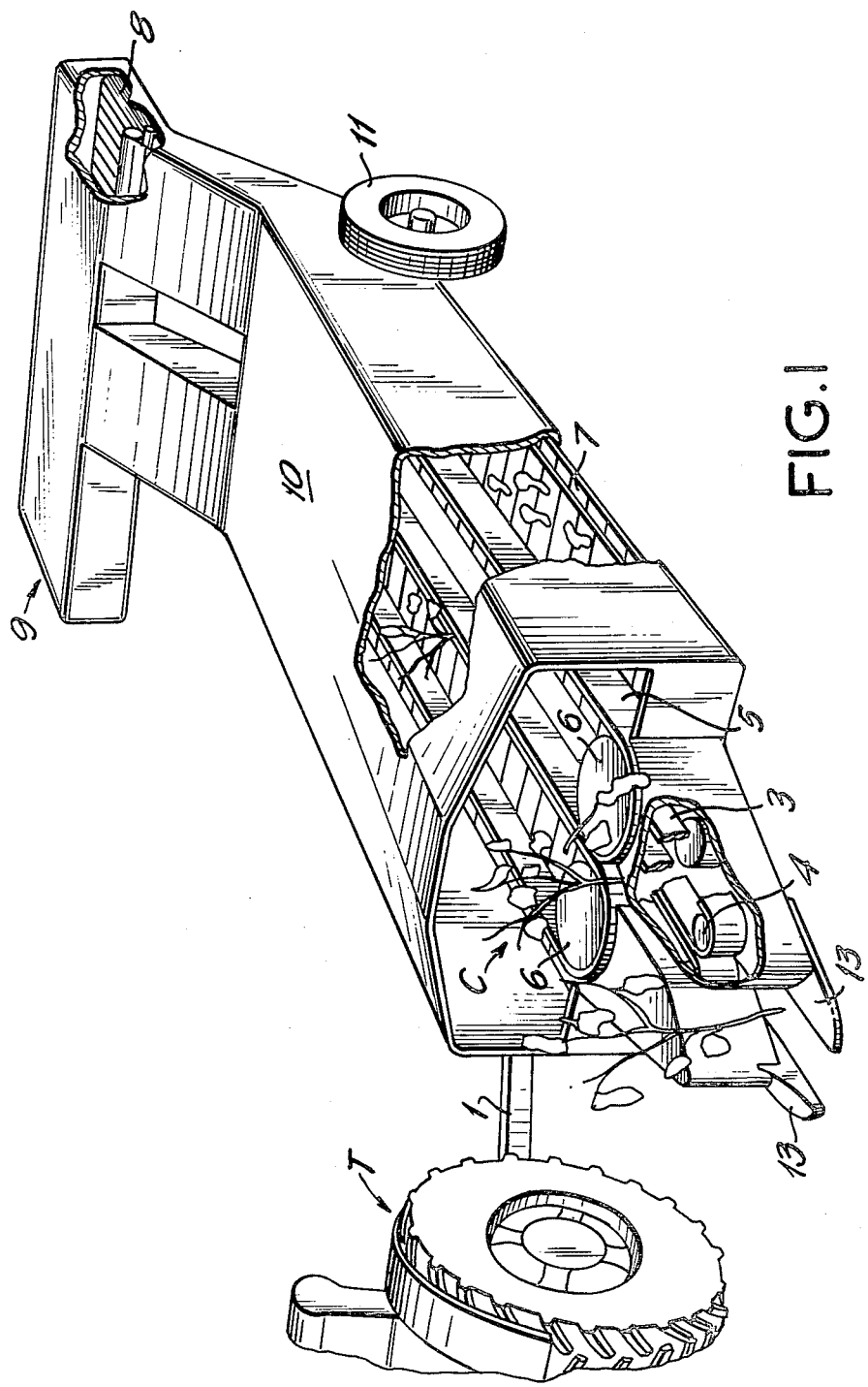

The new machine, as can be gathered from FIG. 1, is intended to be hitched to a tractor represented in FIG. 1 by one of the wheels and indicated as a whole by the letter T. The connection between tractor T and the machine is by means of a bar 1. As can be seen, the tractor as a whole is set off against the machine, or in other words the tractor and the machine travel along two distinct, parallel paths. Accordingly, the leading end of the machine is free to act on plants growing in the path of the machine.

At the said leading end are positioned circular, revolving cutters 2, which cut off the whole cotton plant C by severing its stem just above the roots of the plant. With forward movement of the machine, as it is pulled by the tractor, the lowermost end of the stem of the cotton plant becomes gripped between the inner runs of two conveyor belts 3 which are slung about reels 4, revolving about vertical axes. The reels 4 of one belt revolve in a sense opposite to the other belt. Thus the inner runs of the two belts 3 move close to one another and grippingly hold the stem of plant C conveying it towards a second pair of conveyor belts 5. These belts 5 are slung about two pairs of drums 6 which all revolve in the same sense. The inner runs of the two belts 5 are very close to one another and due to the identical sense of rotation of the drums 6 the two inner runs of belts 5 move in opposite direction. The speed of revolution of drums 6 is rather high, so the stem gripped between the runs of the belts 5 is rotated at high speed, as a consequence thereof the bolls are thrown off by centrifugal force to drop onto band conveyors 7, which carry the bolls to a conveyor 8 which runs across the longitudinal extension of the machine to throw off the collected bolls into a collecting vessel (not shown) at 9. The whole assembly of parts described is enclosed in a housing 10.

The machine travels on wheels 11.

The drive to the different parts is imparted to these in whatever conventional way.

Shovels 13 may be fixed at the leading end of the machine, pushing away stones or other possible obstructions.

I claim:

1. Method of harvesting cotton bolls comprising the steps of:
   - (a) moving a harvesting machine over a row of cotton plants and cutting each cotton plant a short distance above ground;
   - (b) clampingly holding the cut plant on the machine with its main stem substantially in the vertical,
   - (c) imparting revolving movement to the cut plant about the main stem thereof at high speed, and throwing cotton bolls off the plant by centrifugal force, and
   - (d) collecting the thrown off bolls on the machine.

2. A machine for harvesting cotton bolls, comprising: a wheeled chassis adapted to be pulled by a tractor and having a leading end and a trailing end, cutting means being provided at the leading end of said chassis; two pairs of spaced drums with their axes positioned vertically and defining a rectangle positioned on said chassis, an endless belt being slung about each said pair of drums with said drums arranged so that the belt runs in the leading end—trailing end direction, each said belt having an inner run and an outer run with the inner runs of the two said belts being close to one another for clamping the main stem of a cotton bush therebetween, all of said drums being rotationally driven at the same sense of rotation for imparting a rotational movement to the main stem of a cottom bush clamped by the two said belts driven by said drums for separating cotton bolls from the cotton bush, a band conveyor being provided at each side of said wheeled chassis parallel to the said belts and at lower level than the underside of said drums about which the belts are slung for collecting the cotton bolls separated from the cotton bush.

3. A machine as claimed in claim 2, characterized by the provision—at the leading end of said wheeled chassis and at a level above the said cutting means—of two pairs of spaced reels revolving about vertical axes, an endless band extending in the leading end—trailing end direction being slung about each pair of reels, and said reels for each said endless band revolving in opposite senses.

4. A machine as claimed in claim 2 or 3, characterized by the provision of a pair of shovels at the leading end of the wheeled chassis ahead of said cutting means and at a level close to the ground.

* * * * *